United States Patent [19]

Neumann

[11] Patent Number: 4,838,689
[45] Date of Patent: Jun. 13, 1989

[54] METHOD OF AND DEVICE FOR MEASURING THE ATTENUATION OF OPTICAL FIBERS BY MEANS OF THE BACKSCATTER METHOD

[75] Inventor: Ernst-Georg H. Neumann, Wuppertal, Fed. Rep. of Germany

[73] Assignee: U.S. Philips Corp., New York, N.Y.

[21] Appl. No.: 50,828

[22] Filed: May 15, 1987

[30] Foreign Application Priority Data

May 17, 1986 [DE] Fed. Rep. of Germany ....... 3616798

[51] Int. Cl.$^4$ ..................... G01N 21/84; G01N 21/88
[52] U.S. Cl. ................................................. 356/73.1
[58] Field of Search ....................................... 356/73.1

[56] References Cited

FOREIGN PATENT DOCUMENTS 2510287 7/1981 France .

OTHER PUBLICATIONS

Wearden, "The Optical Time Domain Reflectometer", Int Fiber Optics, vol. 2 #2, Mar. 1981, pp. 41-44.
Nakazawa et al., "Photon Probe Fault Locator for Single-Mode Optical Fiber Using an Acoustooptical Light Deflector", IEEE J of Quan. Electronics, vol. QE-17 #7, Jul. 1981, pp. 1264-1269.

*Primary Examiner*—Vincent P. McGraw
*Attorney, Agent, or Firm*—William L. Botjer

[57] ABSTRACT

The invention relates to a method for the time-dependent, automatic measurement of the backscattered portions of light pulses coupled into an optical fiber under test, said portions being received by an optical detector and converted into electrical measurement signals, followed by amplification by a gain factor adapted to the measurement range, application to an electronic evaluation circuit and storage in a memory wherefrom they can be fetched for display on a display device. In the course of an automatic measurement operation at least two time-adjacent time domains ($\Delta t1$, $\Delta t2$) of measurement signals (6) are measured with different gain factors in order to be stored in memories (S1, S2) which are associated with the respective gain factors and which can be independently addressed.

10 Claims, 1 Drawing Sheet

METHOD OF AND DEVICE FOR MEASURING THE ATTENUATION OF OPTICAL FIBERS BY MEANS OF THE BACKSCATTER METHOD

BACKGROUND OF THE INVENTION

The invention relates to a method for the time-dependent, automatic measurement of the backscattered portions of light pulses coupled into an optical fibre under test, said portions being received by an optical detector and converted into electrical measurement signals, followed by amplification by a gain factor adapted to the measurement range, application to an electronic evaluation circuit and storage in a memory wherefrom they can be fetched for display on a display device.

A method of this kind is known from IEEE Journal of Quantum Electronics, Vol. QE-17, Pages 1264 to 1269. Therein, selected time domains of the optical backscattered signals are examined using an adapted gain factor, so that either the available dynamic range of an amplifier can be fully utilized or, in the case of a given dynamic range, a longer measurement length of an optical fibre can be examined. However, the known method is only capable of covering a part of the length of an optical fibre in the case of an automatic measurement. The dynamic range expansion will not be obtained when the entire length of a long optical fibre is to be measured in a single operation and the variation of the attenuation values as a function of location along the entire length of the optical fibre is to be subsequently represented as a single, continuous curve.

SUMMARY OF THE INVENTION

It is an object of the invention to modify the described method so that uniform measurement of the attenuation values of a long optical fibre and a continuous display of the measured backscatter curve can be realized with great accuracy, without imposing excessively high requirements as regards the dynamic range of the electrical components required.

This object is achieved in that in the course of an automatic measurement operation at least two time-adjacent time domains of measurement signals are measured with different gain factors in order to be stored in memories which are associated with the respective gain factors and which can be independently addressed.

In the present context, time domains are to be understood to mean periods of time during which signals scattered back from more or less remote length portions of the optical fibre are received with different delays. Thus, these time domains correspond to assignable local portions of an optical fibre to be tested.

In accordance with the invention, two or more preferably digital additional memory devices and also additional amplifiers or one switchable amplifier are required. However, because use can be made of amplifiers and analog-to-digital converters having a substantially smaller dynamic range, the overall expenditure will be less.

On the other hand, it will be apparent that, when an as large as possible dynamic range is maintained, the range of the measurement method can be substantially increased in accordance with the invention.

The independently addressable memories can be combined so as to form a single unit. It is essential that data groups assigned to different time domains and stored with a different scale can be independently addressed.

The different data groups can be electronically displayed on a display device, for example an x-y-plotter or video monitor, in the form of a uniform, continuous curve in a manner known to those skilled in the art, so that the operator cannot distinguish the display of measurement data from that obtained by means of known methods.

A preferred version of the method in accordance with the invention is characterized in that, when use is made of a single amplifier whose gain factor can be switched over, the various time domains are measured with backscatter signals which originate from different light pulses.

The time-controlled automatic switching over of the gain factor of an amplifier requires a stabilization period during which the amplifier can reach the new stable state and during which, of course, no measurement data can be derived. However, in order to ensure that neighbouring time domains can still be covered without gaps, the associated stored data are determined on the basis of backscatter signals originating from different light pulses.

Backscatter signals of later time domains, scattered by remote length portions of the optical fibre to be tested, have a comparatively low level and are processed with a correspondingly higher gain factor. In order to prevent high signal levels from prematurely reaching the amplifier, thus overloading the amplifier, in a preferred version in accordance with the invention at least the measurement signals which exceed the permissible level are blocked by means of an optical switch during the measurements utilizing the higher gain factor. The amplifier then operates with optimum accuracy in the relevant time domain.

For the measurement of backscatter curves, a measurement operation consists of a plurality of individual measurements wherefrom mean values are electronically determined. Accordingly, substantial measurement periods occur. Especially short measurement periods are possible in that an amplifier having a different gain factor is associated with each memory, said amplifiers simultaneously receiving the measurement signals in parallel. This version of the method in accordance with the invention necessitates an own amplifier for each time domain, but the measurement data of each time domain can then be measured during a common sequence of backscatter signals. In comparison with the previously described solution, the measurement time will then be a factor 1/n smaller in the case of a number of n time domains to be covered.

Notably in the case of the latter solution it is advantageous when the amplifier having the higher gain factor is preceded by a level limiter in order to prevent overloading of notably the amplifiers associtated with the later time domains.

In a preferred version of the method in accordance with the invention, the time domains of the stored data overlap in time. Consequently, on the one hand it is ensured that measurement data are obtained over the entire length of an optical fibre to be examined without gaps. On the other hand, this also offers the attractive possibility of determining, from at least one pair of values of the data stored in the memories, measured for the same backscatter points within the overlapping region, an evaluation constant by means of an arithmetic circuit in order to convert the data stored in the second memory, after which they can be fetched with the same scale as the data stored in the first memory.

Because of unavoidable tolerances and because of fluctuating environment conditions, there is a risk that the attenuation values stored for one and the same backscatter location in memories associated with different time domains do not correspond exactly, so that unstable locations may occur on a display device at the boundary of two domains, said instabilities unduly indicating a fault in the optical fibre. As a result of the automatic arithmetical adaptation of the backscatter curves in the overlapping region, there will always be obtained a smooth curve as well as values which have absolutely exactly the same scale in the neighbouring domains.

When direct measurement values are stored, the evaluation constant is preferably chosen as a mean value of the quotient of the pairs of values averaged over a large number of pairs of values in the ovelapping region.

However, when the measurement signals are stored in logarithmic form, the evaluation constant is preferably formed by a difference between the measurement signals in logarithmic form whereby the values of a next time domain must be reduced, for example in the case of representation in the form of a curve.

A measuring device for carrying out the method in accordance with the invention is characterized in that it comprises at least two mutually independent digital memory elements which are connected to outputs of an electronic evaluation circuit whose input is connected to an optical detector, the device comprising an arithmetic circuit whose input is connected to the memories and whose output is connected to a display device. These are the components which are specific of the invention and which must be used to supplement known devices.

BRIEF DESCRIPTION OF THE DRAWINGS

The invention will be described in detail hereinafter with reference to the accompanying diagrammatic drawing.

DETAILED DESCRIPTION OF THE PREFERRED EMBODIMENTS

Figure 1:
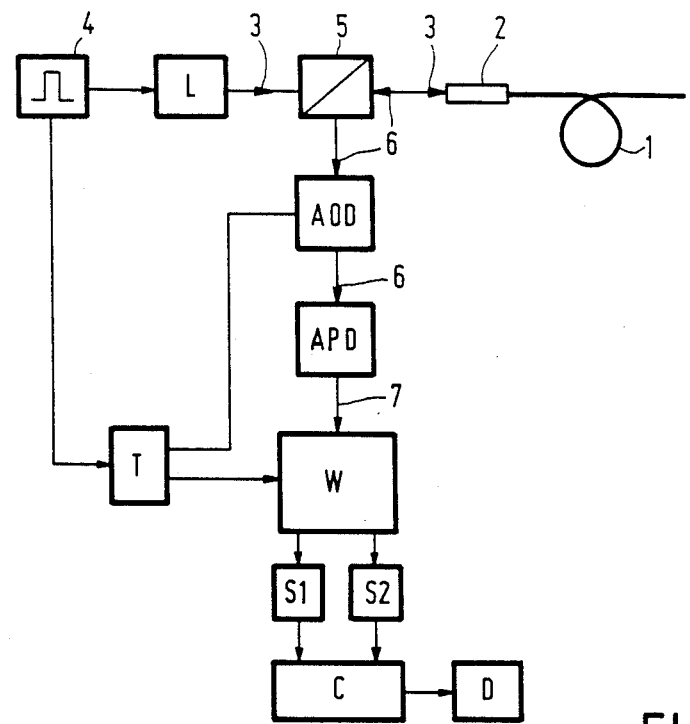
FIG. 1 shows a block diagram of a measuring device for carrying out the method in accordance with the invention.

The measuring device shown in FIG. 1 serves to measure the attenuation behaviour of a test length of an optical fibre 1 which is connected to the measuring device via a coupling 2.

A series of light pulses 3 is coupled into the optical fibre, via the beam splitter 5, by the laser L which is controlled by the pulse generator 4. During a period of time which corresponds to the length of the optical fibre 1, backscatter signals 6 from each light pulse 3 are deflected to an avalanche photodiode APD by the beam splitter 5, via the switch AOD which is constructed as an acousto-optical deflector. The electrical output signal thereof, constituting the measurement signal 7, is amplified and processed in a customary manner in an electronic evaluation circuit W; it is notably split into a plurality of digital measurement data by analog to digital converters, said data being associated with different backscatter locations and being stored in the memory S1 or S2. The data can be fetched therefrom via the arithmetic circuit C for display on a display device D, notably in the form of a curve.

The memory S1 stores the less amplified data of those measurement signals which arise by backscattering from the starting zone of the optical fibre 1. The memory S2 stores the more amplified measurement signals which appear from the end zone of the optical fibre after a longer delay. The timer circuit T, is provided for the time-wise coordination of the electronic operations and for the correct timing of the actuation of the optical switch AOD.

Figure 2:
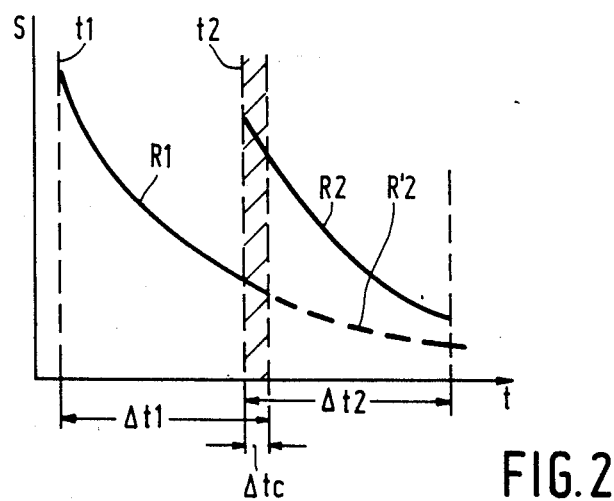
FIG. 2 shows the variation in time of measurement data stored in memories associated with neighbouring time domains.

The analog values s of the digital data stored in the memory S1 (backscatter curve R1) and in the memory S2 (backscatter curve R2) are shown in FIG. 2 as a function of the backscatter time t following a transmission pulse.

the backscatter curve R1 is based on a lower gain factor. The associated digital data were measured with a constantly open (not acoustically excited) optical switch AOD and stored in the memory S1 during the first time domain $\Delta t1$. During the next pulse 3 of the laser L, the gain factor was increased. During the reflection time of the light reflected from the starting zone of the optical fibre 1 the AOD was acoustically excited so that its output beam no longer reached the optical detector APD. Thus, the amplifier could not be overloaded. Measurement and storage of the digital data in the time domain $\Delta t2$ in the memory S2 took place only after the instant t2.

The arithmetic circuit forms the respective quotient of the values of both backscatter energies for a plurality of instants in the overlapping regiona $\Delta tc$ of the backscatter curves R1 and R2. The mean value serves as an evaluation constant whereby, for example, the data of the memory S2 which are applied to the display device D are multiplied. The display device then displays the backscatter curve R2 as a smooth continuation R2 of the backscatter curve R1.

What is claimed is:

1. A method for the time dependent, partially automatic measurement of the backscattered portions of light pulses coupled into an optical fibre under test, comprising the steps of:
   receiving said backscattered portions with an optical detector;
   converting said received backscattered portions into electrical measurement signals;
   amplifying said electrical measurement signals by a gain factor adjusted to the measurement range of the signals;
   applying said amplified signals to an electronic evaluation circuit;
   storing said amplified signals in memory means to enable same to be displayed on a display device;
   measuring, during the course of an automatic measuring operation, at least two time adjacent time domains ($\Delta t1$, $\Delta t2$) of measurement signals with different gain factors; and
   storing said measured signals in separate portions of memory (S1, S2) which are associated with said different gain factors and which are independently addressable.

2. A method as claimed in claim 1, characterized in that the method utilizes a single amplifier whose gain factor can be switched over, the various time domains ($\Delta t1$, $\Delta t2$) are measured with backscatter signals (6) which originate from different light pulses (3).

3. A method as claimed in claim 1 or 2, characterized in that the input signals which exceed the permissible level are blocked by means of an optical switch (AOD) during the measurements utilizing the higher gain factor.

4. A method as claimed in claim 1, characterized in that with each memory (S1, S2) there is associated a respective amplifier having different gain factors, measurement signals (7) being simultaneously applied thereto in parallel.

5. A method as claimed in claim 1 or 2, characterized in that the amplifier having the higher gain factor is preceded by a level limiter.

6. A method as claimed in claim 1, characterized in that the time domains ($\Delta t1$, $\Delta t2$) of the stored data overlap in time ($\Delta tc$).

7. A method as claimed in claim 6, characterized in that from at least one pair of values of the data stored in the memories (S1, S2), measured for the same backscatter points within the overlapping region ($\Delta tc$), an evaluation constant is determined by means of an arithmetic circuit (C) in order to convert the data stored in the second memory (S2), after which they can be fetched with the same scale as the data stored in the first memory (S1).

8. A method as claimed in claim 7, characterized in that the evaluation constant is determined as a mean value of the quotient of the pairs of values averaged over a large number of pairs of values in the overlapping region.

9. A method as claimed in claim 7, characterized in that the evaluation constant is formed by a difference between the measurement signals (7), in logarithmic form.

10. A measuring device for carrying out the method claimed in claim 1, characterized in that it comprises at least two mutually independent digital memory elements (S1, S2) which are connected to outputs of an electronic evaluation circuit (W) whose input is connected to an optical detector (APD), the device comprising an arithmetic circuit (C) whose input is connected to the memories (S1, S2) and whose output is connected to a display device (D).

* * * * *